United States Patent
Inman et al.

(10) Patent No.: US 8,757,937 B1
(45) Date of Patent: Jun. 24, 2014

(54) DRILL TEMPLATE TOOL WITH INTEGRAL SEAL

(75) Inventors: John E. Inman, Frontenac, MO (US);
David M. Dietrich, Saint Peters, MO (US); John G. Macke, Jr., St. Charles, MO (US); Michael W. Hayes, Belleville, IL (US)

(73) Assignee: The Boeing Company, Chicago, IL (US)

( * ) Notice: Subject to any disclaimer, the term of this patent is extended or adjusted under 35 U.S.C. 154(b) by 917 days.

(21) Appl. No.: 12/561,268

(22) Filed: Sep. 17, 2009

(51) Int. Cl.
*B23B 45/14* (2006.01)

(52) U.S. Cl.
USPC .............................. 408/76; 408/97; 408/115 R

(58) Field of Classification Search
USPC .............................. 408/76, 97, 115, 95, 115 R
See application file for complete search history.

(56) References Cited

U.S. PATENT DOCUMENTS

| | | | |
|---|---|---|---|
| 2,910,895 A * | 11/1959 | Winslow | 408/10 |
| 4,582,460 A * | 4/1986 | Silverberg et al. | 409/175 |
| 5,807,034 A * | 9/1998 | Perlmutter et al. | 408/67 |
| 6,851,898 B2 * | 2/2005 | Ege et al. | 408/67 |
| 6,851,900 B2 * | 2/2005 | Tillemans et al. | 409/130 |
| 7,195,429 B2 | 3/2007 | Dods et al. | |
| 2003/0170082 A1 * | 9/2003 | Garcia et al. | 408/1 R |
| 2009/0172911 A1 * | 7/2009 | Miyanaga | 15/339 |

FOREIGN PATENT DOCUMENTS

CH  683677 A5 *  4/1994  ............. B23B 49/02

OTHER PUBLICATIONS

Full English Translation—Kaufmann et al. (1994). Switzerland Patent No. CH 683677 A5.*

* cited by examiner

*Primary Examiner* — Daniel Howell
*Assistant Examiner* — Michael Vitale

(57) ABSTRACT

The disclosure provides in one embodiment for an integral seal for a drill template tool for a structure having an outside mold line surface fabricated according to a precise definition using computer aided design (CAD). The integral seal comprises an inner surface in contact with an interior portion of a continuous groove portion formed in a bottom surface of a vacuum housing of the drill template tool. The integral seal further comprises an outer surface in contact with the structure. The integral seal is formed in the groove portion on the bottom surface of the vacuum housing, and the groove portion is formed using one of selective laser sintering, fused deposition modeling, or stereolithography, during fabrication of the drill template tool. The integral seal prevents leakage of fluids and debris generated by a drilling process of the structure.

21 Claims, 5 Drawing Sheets

DRILL TEMPLATE TOOL WITH INTEGRAL SEAL

BACKGROUND

1) Field of the Disclosure

The disclosure relates to the manufacture and assembly of structures using composite and metallic materials, and more particularly, to drill template tools for drilling holes at precise locations in parts, such as composite or metallic aircraft parts.

2) Description of Related Art

In conventional practice, before a pattern of holes is drilled in a part to be assembled into a structure, a template, or jig, is made and placed on the surface of the part to be drilled. For example, in the aerospace industry, the structure or assembly may be a composite aircraft skin over an aluminum substructure. The template or jig contains holes conforming to the desired hole pattern that is to be made on the surface of the part to be drilled. A drill is then inserted, typically manually by a drill operator, in each hole of the jig and is used to drill a hole into or through the part. Known drill template tools exist. However, such known drill template tools do not include an integral seal to contain fluids and debris, such as composite dust and/or metallic drill chips, generated by the drilling and manufacturing process. Such fluids and debris can flow on and around the drill template tool and the component or structure being drilled, can form puddles on the floor of the working area and environment, and can cause the working area and environment to become messy and a problem area. Thus, such fluids and debris must be cleaned up after the drilling and manufacturing process, and such clean-up can result in increased labor costs to remove the fluids and debris from the affected areas and can result in increased time to complete the manufacturing process.

Accordingly, there is a need for an improved drill template tool with an integral seal that provides advantages over known devices.

SUMMARY

This need for an improved drill template tool with an integral seal is satisfied. Unlike known devices, embodiments of the drill template tool with integral seal may provide one or more of the following advantages: provides a drill template tool with an integral seal that contains fluids and debris, such as composite dust and/or metallic drill chips, generated by the drilling and manufacturing process; provides a drill template tool with an integral seal that provides a direct labor cost savings by the substantial reduction in clean-up time required for the existing fluids and debris; provides a drill template tool with an integral seal that improves the working environment of the drill operator during the component drill manufacturing process by preventing fluids and debris from flowing and leaking during the drilling process; provides a drill template tool with an integral seal that can result in decreased time to complete the manufacturing process because little or no clean-up is required of fluids and debris; provides a drill template tool that reduces the cost of structural components through a reduction in time associated with the clean-up of fluids and debris during the drilling and manufacturing process; provides a drill template tool that simplifies the work conducted by operators when drilling structural components; provides a drill template tool that prevents puddles of liquid and debris from forming on the floor of the working area and environment, and minimizes or prevents the working area and environment from becoming messy and a problem area; provides a drill template tool with an integral seal that incorporates the integral seal into the drill template tool through the use of additive manufacturing technology or another suitable technology during the fabrication of the drill template tool; provides a drill template tool with an integral seal that facilitates the removal of drilling generated liquids and debris by a vacuum system associated with the drill template tool by the integral seal containing the fluids and debris so they can be sucked up and removed by the vacuum system; and provides a drill template tool with an integral seal that increases the vacuum pressure under the drill template tool to improve the overall performance of the drill template tool.

In an embodiment of the disclosure, there is provided a drill template tool with an integral seal for a structure having an outside mold line surface fabricated according to a precise definition using computer aided design (CAD). The drill template tool with the integral seal comprises a vacuum housing having a CAD-formed contact surface integral with and formed of the same material as the vacuum housing. The vacuum housing and the contact surface are built directly from the precise definition for the outside mold line surface of the structure using one of selective laser sintering, fused deposition modeling, or stereolithography, so that the vacuum housing contact surface has a form of an exact fit to the outside mold line surface of the structure at the CAD-formed contact surface whether or not in contact with the structure. The drill template tool further comprises at least one drill bushing extending through the vacuum housing from a top surface of the vacuum housing to a bottom surface of the vacuum housing. The drill template tool further comprises an integral seal formed in a groove portion on the bottom surface of the vacuum housing, wherein the integral seal is in contact with the structure.

In another embodiment of the disclosure, there is provided a drilling system for an aircraft structure having an outside mold line surface formed according to a computer aided design (CAD) engineering model, and having the outside mold line surface specified using CAD electronic data files of the CAD engineering solid model. The system comprises a drill template tool with an integral seal comprising a vacuum housing having a CAD-formed contact surface integral with and formed of the same material as the vacuum housing. The vacuum housing and the contact surface are built directly from the CAD engineering model for the outside mold line surface of the structure using one of selective laser sintering, fused deposition modeling, or stereolithography, so that the vacuum housing contact surface has a form of an exact fit to the outside mold line surface of the structure at the CAD-formed contact surface whether or not in contact with the structure. The system further comprises at least one drill bushing extending through the vacuum housing from a top surface of the vacuum housing to a bottom surface of the vacuum housing. The system further comprises at least one vacuum port integral to the vacuum housing, wherein the vacuum housing and the vacuum port are integrally fabricated. The system further comprises an integral seal formed in a groove portion on the bottom surface of the vacuum housing, wherein the integral seal is in contact with the aircraft structure.

In another embodiment of the disclosure, there is provided an integral seal for a drill template tool for a structure having an outside mold line surface fabricated according to a precise definition using computer aided design (CAD). The integral seal comprises an inner surface in contact with an interior portion of a continuous groove formed on a bottom surface of a vacuum housing of the drill template tool. The integral seal further comprises an outer surface in contact with the structure. The integral seal is formed in the continuous groove on the bottom surface of the vacuum housing one of selective laser sintering, fused deposition modeling, or stereolithography, during fabrication of the drill template tool. The integral seal prevents leakage of fluids and debris generated by a drilling process of the structure.

In another embodiment of the disclosure, there is provided a method for drilling holes in a structure using a drill template tool with an integral seal. The method comprises providing a drill template tool with an integral seal. The drill template tool with the integral seal comprises a vacuum housing having a CAD-formed contact surface integral with and formed of the same material as the vacuum housing. The vacuum housing and the contact surface are built directly from a precise definition for an outside mold line surface of the structure using one of selective laser sintering, fused deposition modeling, or stereolithography, so that the vacuum housing contact surface has a form of an exact fit to the outside mold line surface of the structure at the CAD-formed contact surface whether or not in contact with the structure. The drill template tool with the integral seal further comprises at least one drill bushing extending through the vacuum housing from a top surface of the vacuum housing to a bottom surface of the vacuum housing. The drill template tool with the integral further comprises an integral seal formed in a groove portion on the bottom surface of the vacuum housing, wherein the groove portion is formed using one of selective laser sintering, fused deposition modeling, or stereolithography. The method further comprises securing the drill template tool with integral seal to a surface of the structure, the integral seal being in contact with the surface of the structure. The method further comprises attaching a vacuum fitting to the drill template tool with integral seal. The method further comprises supplying a vacuum pressure to the drill template tool with integral seal. The method further comprises drilling holes in the structure with a drill. The method further comprises containing with the integral seal any fluids and debris generated by the drilling. The method further comprises removing the contained fluids and debris.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

The disclosure provides for an improved drill template tool with integral seal. The improved drill template tool with integral seal device of the disclosed embodiments may be used to manufacture composite and metallic parts for use on aircraft, spacecraft, watercraft, and other vehicles and craft. Accordingly, one of ordinary skill in the art will recognize and appreciate that the improved drill template tool with integral seal device of the disclosure can be used in any number of applications involving such vehicles and craft.

Figure 1:
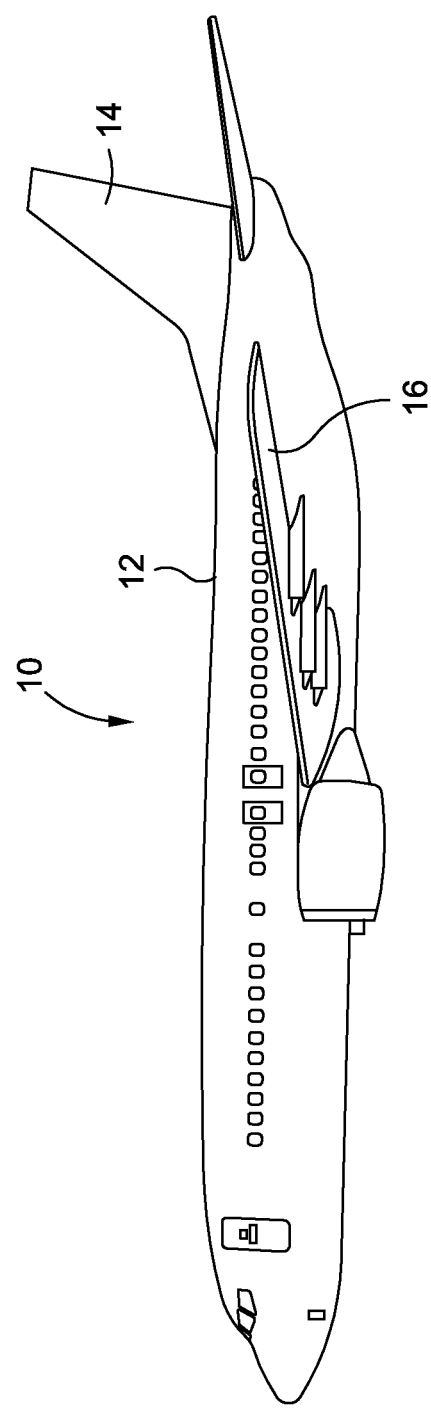
FIG. 1 is an illustration of an aircraft made from composite and metallic parts that can be made by advantageous embodiments of the drill template tool with integral seal of the disclosure.

FIG. 1 is an illustration of an aircraft 10 made from composite and metallic parts that can be made by advantageous embodiments of the drill template tool with integral seal of the disclosure. For example, such composite and metallic parts may be used on portions of the aircraft 10, including but not limited to, a body or fuselage portion 12, a tail portion 14, and a wing portion 16.

Figure 2:
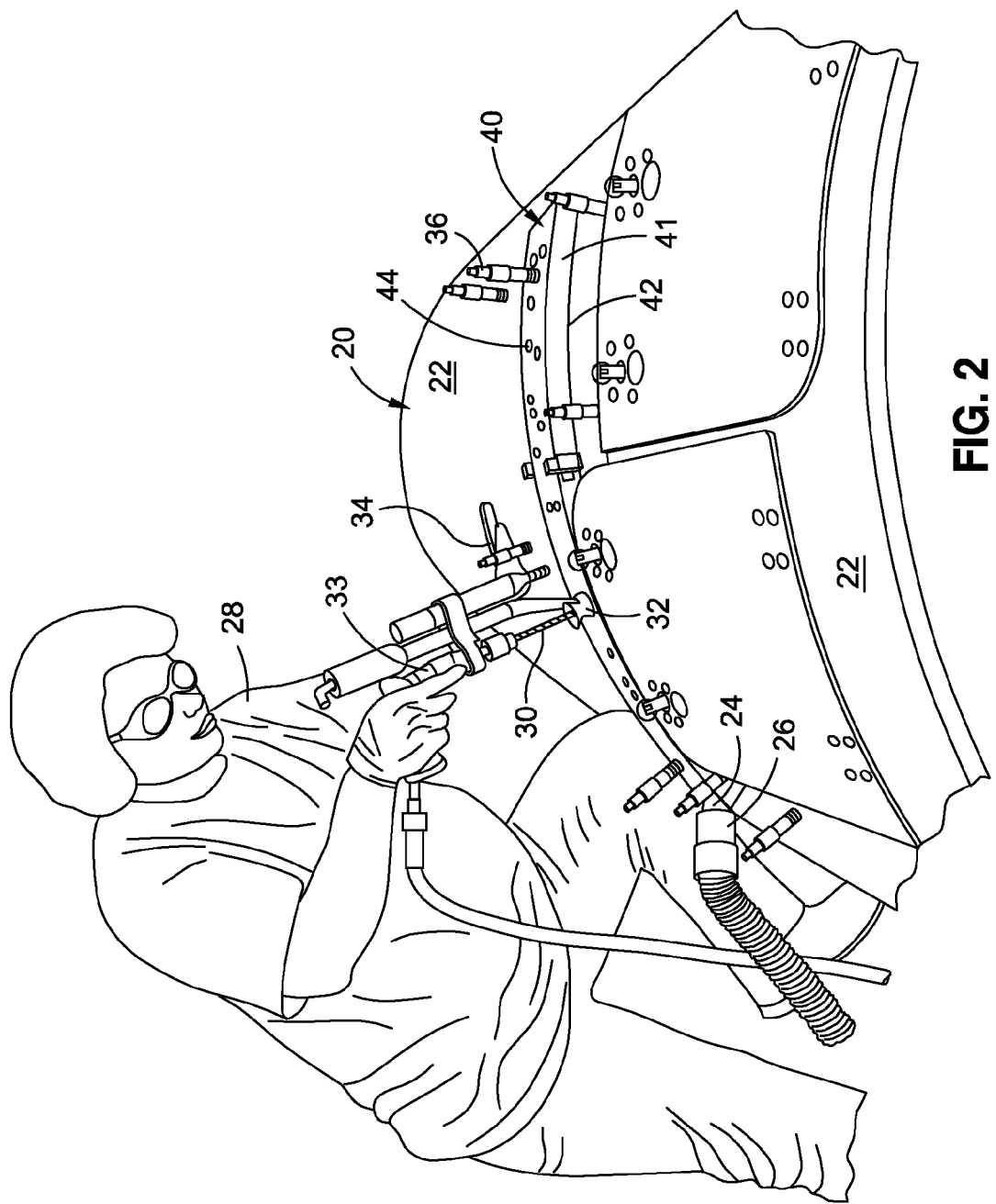
FIG. 2 is an illustration of a top perspective view of one of the embodiments of the drill template tool with integral seal of the disclosure.

FIG. 2 is an illustration of a top perspective view of one of the embodiments of a drill template tool 40 used with the drill template tool with integral seal of the disclosure. The drill template tool 40 and the operation thereof are disclosed in detail in U.S. Pat. No. 7,195,429, for "Drill Template with Integral Vacuum Attach", assigned to The Boeing Company of Chicago, Ill., the same assignee as in the subject application. U.S. Pat. No. 7,195,429 is herein incorporated by reference in its entirety. FIG. 2 shows the drill template tool 40 that allows the formation of a predefined pattern of holes on a structure 20 having an outside mold line surface 22, such as a structure which may comprise an outer skin over a substructure built according to a CAD (computer aided design) solid model. The drill template tool 40 may be located to the substructure using the CAD-formed edge of part locators formed on a vacuum housing 41 of the drill template tool 40 according to the same CAD solid model according to which the structure 20 is built. The drill template tool 40 is preferably designed in a CAD program, such as Unigraphics, CATIA, Solid Works, or another suitable CAD program, and subsequently fabricated with a fused deposition modeling process, a laser sintering process using nylon powder or another suitable powder, a stereolithography process, or another suitable additive manufacturing process or layer manufacturing process. Preferably, the process is a fused deposition modeling process utilizing high temperature, chemical resistant polymers, such as polyetherimides (thermoplastics) from SABIC Innovative Plastics of Houston, Tex. Preferably, the polyetherimides (thermoplastics) are heat resistance, solvent resistance and flame resistance, have high mechanical properties, and perform in continuous use to 340° F. (170° C.).

As shown in FIG. 2, an operator 28 may manually perform the drilling process while drilling debris is automatically removed and collected by a vacuum system (not shown) attached to the drill template 40 at a vacuum port 24 via a vacuum hose fitting 26. As shown in FIG. 2, the operator 28 may experience very little ergonomic stress and may have a free hand 34 to support herself. The vacuum housing 41 of the drill template tool 40 may comprise a drill support attachment 32 and one or more drill bushings 44 for receiving a drill bit 30. The drill support attachment 32 may be locked onto a drill 33 to help control the placement of the drill bit 30 into one or more of the drill bushings 44. The drill template 40 may be secured to the structure 20 with pin clamps 36.

In an embodiment of the disclosure, there is provided a drill template tool 40 for a structure 20 having an outside mold line surface 22 fabricated according to a precise definition using computer aided design (CAD). The drill template tool 40 comprises a vacuum housing 41 having a CAD-formed contact surface 42 integral with and formed of the same material as the vacuum housing 41. The vacuum housing 41 and the contact surface 42 are built directly from the precise definition for the outside mold line surface 22 of the structure 20 using a process such as selective laser sintering, fused deposition modeling, stereolithography, or another suitable process. Preferably, the vacuum housing contact surface has the form of an exact fit to the outside mold line surface 22 of the structure 20 at the CAD-formed contact surface 42 whether or not in contact with the structure 20. The drill template tool 40 further comprises at least one drill bushing 44 extending through the vacuum housing 41 from a top surface 55 of the vacuum housing 41 to a bottom surface 54 of the vacuum housing 41. The drill template tool 40 further comprises an integral seal 50 formed in a groove portion 52 on the bottom surface 54 of the vacuum housing 41. In use, the integral seal 50 is in contact with the structure 20. The CAD-formed contact surface 42 of the vacuum housing 41 conforms to a CAD engineering solid model of the outside mold line surface 22 of the structure 20.

Figure 3:
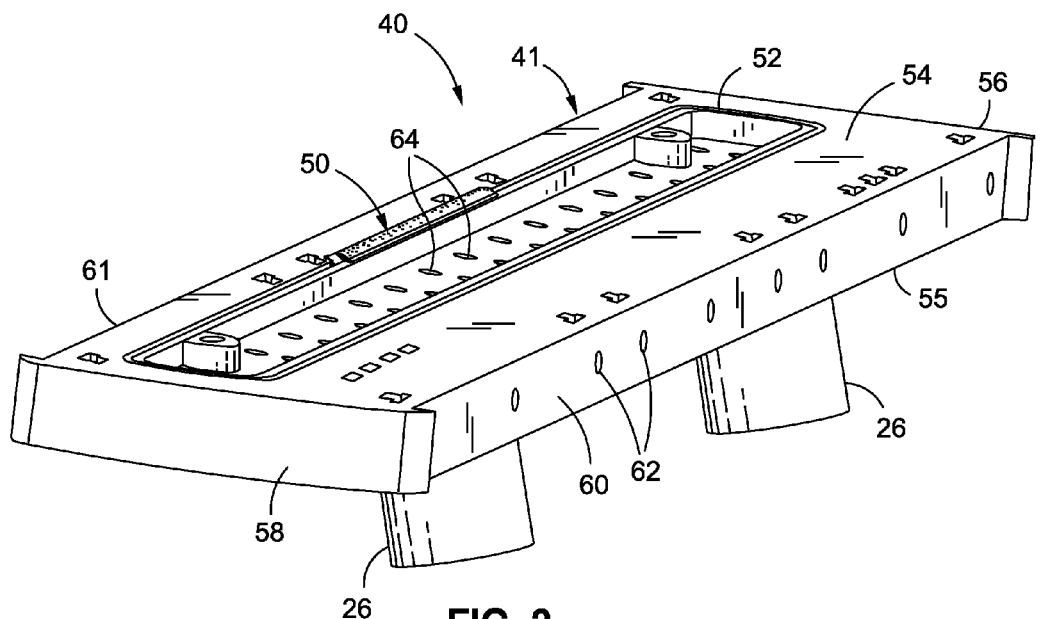
FIG. 3 is an illustration of a bottom perspective view of one of the embodiments of the drill template tool with integral seal of the disclosure.

FIG. 3 is an illustration of a bottom perspective view of one of the embodiments of the drill template tool 40 showing an integral seal 50 that can be inserted or provided in a continuous groove portion 52 located within a bottom surface 54 of the vacuum housing 41 of the drill template tool 40. The continuous groove portion 52 is integrated directly into the CAD design of the drill template tool 40 and does not require any milling out or later fabrication of the groove portion 52. The integral seal 50 may be formed in the continuous groove portion 52 on the bottom surface 54 of the vacuum housing 41, and the groove portion 52 may be formed using selective laser sintering, fused deposition modeling, stereolithography, or another suitable process, during fabrication of the drill template tool.

The vacuum housing 41 of the drill template tool 40 comprises the top surface 55 (see FIG. 2) opposite the bottom surface 54, a first end 56, a second end 58, a first side skirt 60, and a second side skirt 61 opposite the first side skirt 60. One or more vacuum hose fittings 26 may be coupled to the top surface 55 of the vacuum housing 41 and are designed to be connected to one or more respective vacuum hoses (not shown). The drill template tool 40 further comprises a plurality of holes 62 on the first side skirt 60 to facilitate connection with another vacuum housing. The drill template tool 40 further comprises a plurality of holes 64 to accommodate drill bushings 44. In one embodiment as shown in FIG. 3, the integral seal 50 may be incorporated into the continuous groove portion 52 that is continuous around the periphery of the bottom surface 54 of the vacuum housing 41 of the drill template tool 40, and in use, the integral seal 50 is designed to be in contact with the structure 20 (see FIG. 2).

Figure 4:
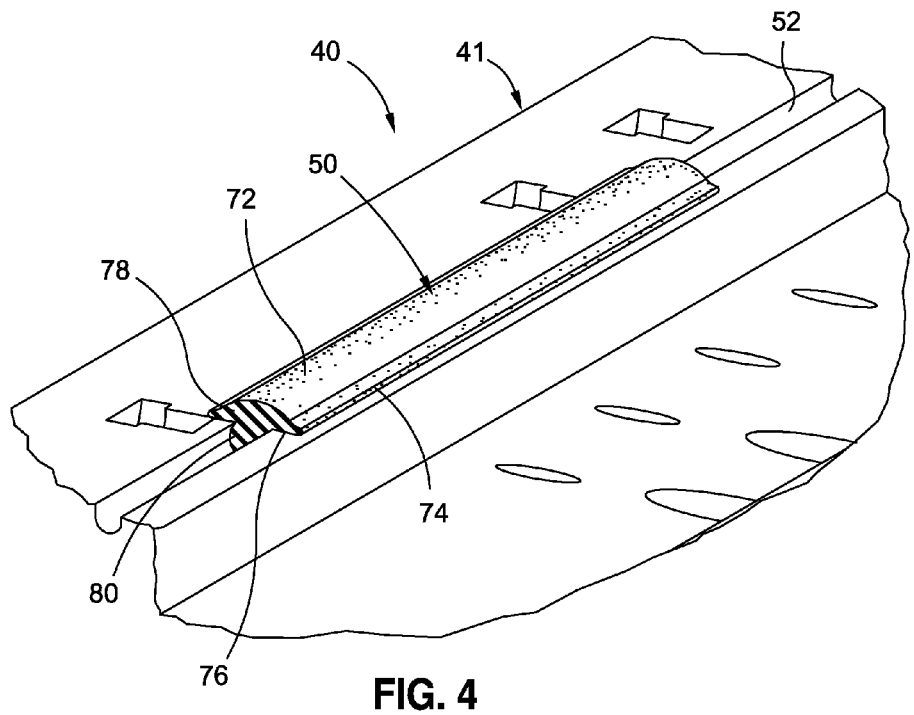
FIG. 4 is an illustration of a close-up bottom perspective view of the drill template tool with integral seal of FIG. 3.

FIG. 4 is an illustration of a close-up bottom perspective view of the drill template tool 40 with integral seal 50 of FIG. 3. The integral seal 50 comprises an outer surface 72, an inner surface 76 opposite the outer surface 72, a first side portion 74, a second side portion 78 opposite the first side portion 74, and a central interior portion 80. In use, the outer surface 72 is preferably in contact with the outer surface of the structure 20 (see FIG. 2), and the inner surface 76 is preferably in contact with both a portion of the bottom surface 54 of the vacuum housing 41 and the interior of the groove portion 52. The integral seal 50 is preferably comprised of a pliable, flexible material such as an elastomer or another suitable material. Preferably, the integral seal 50 may be in the form of an O-ring or a gasket. Preferably, the integral seal 50 is inserted into the continuous groove portion 52 of the bottom surface 54 of the vacuum housing 41 via manual compression fit, that is, the integral seal or integral seal material is manually pushed and fitted into the continuous groove portion 52. The integral seal 50 is preferably easily inserted for installation and easily removable for replacement when necessary.

Figure 5:
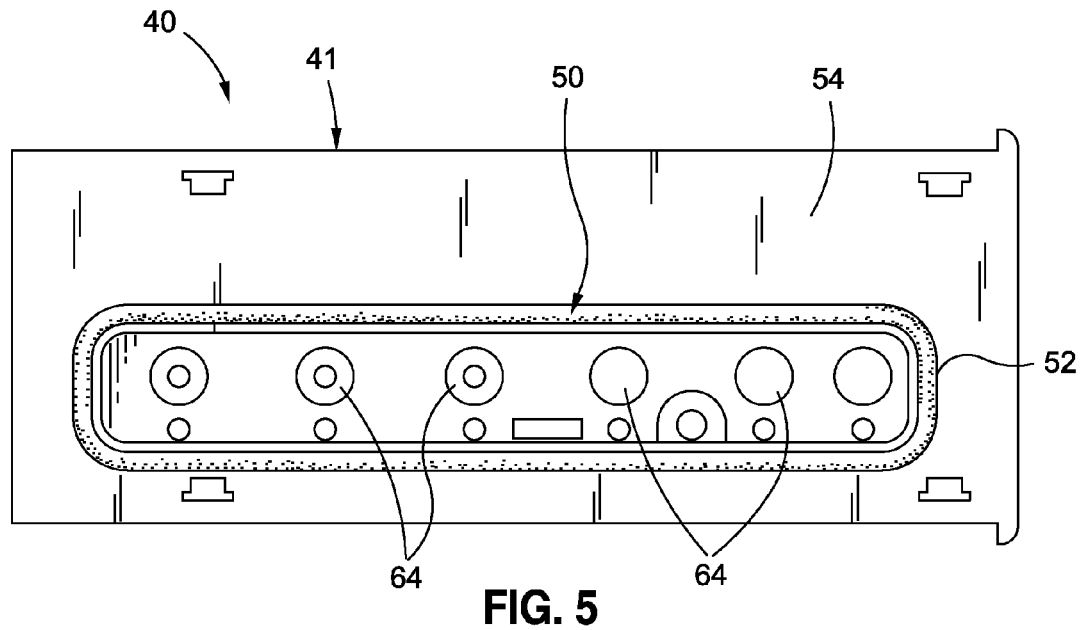
FIG. 5 is an illustration of a bottom view of another one of the embodiments of the drill template tool with integral seal of the disclosure.
Figure 6:
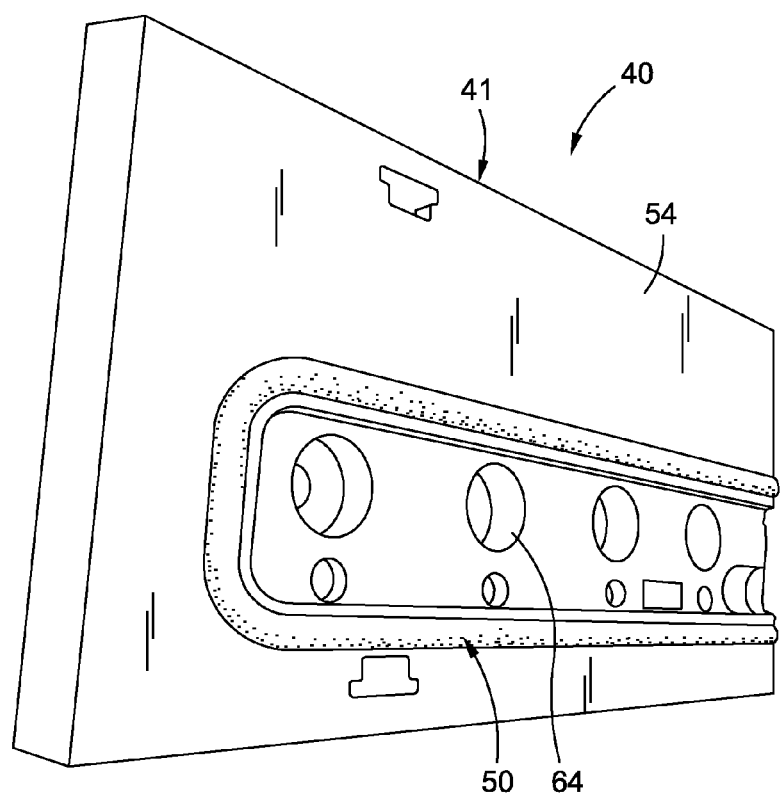
FIG. 6 is an illustration of a side view of the drill template tool with integral seal of FIG. 5; and, FIG. 7 is an illustration of a flow diagram of the steps of an embodiment of a method of drilling holes in a structure using one of the embodiments of the drill template tool with integral seal of the disclosure.

FIG. 5 is an illustration of a bottom view of another one of the embodiments of the drill template tool 40 with the integral seal 50 inserted into the continuous groove portion 52 located on the bottom surface 54 of the vacuum housing 41 of the drill template tool 40. The integral seal 50 surrounds the plurality of holes 64. FIG. 6 is an illustration of a side view of the drill template tool 40 with the integral seal 50 of FIG. 5.

The integral seal 50 inserted into the continuous groove portion 52 is designed to contain or prevent leakage of fluids, such as water and drilling wash, and debris, such as composite dust and/or metallic drill chips, generated during and by the drilling and manufacturing process. The integral seal 50 is further designed to allow the vacuum hose fitting 26 of the vacuum system (not shown) to pull or suck the fluids and debris away from an aircraft assembly area (not shown) and away from operators and workers working in the aircraft assembly area. In addition, the integral seal 50 is designed to increase the vacuum pressure on the bottom surface 54 of the vacuum housing 41 of the drill template tool 40 which can improve the overall performance of the drill template tool 40. The integral seal 50 is preferably incorporated into the groove portion 52 on the bottom surface 54 of the vacuum housing 41 of the drill template tool 40, and the groove portion 52 may be formed through the use of an additive manufacturing process or another suitable process used during the fabrication of the drill template tool.

Once the integral seal 50 is installed in the drill template tool 40, a cleaner post-drilled structural surface results that includes containment of fluids and debris generated by the drilling and manufacturing process. The integral seal 50 facilitates the containment of fluids and debris during the manufacturing process so that such fluids and debris can be sucked out and removed by vacuum pressure and the vacuum system, prevents the drilling fluids and debris from spilling out, isolates negative pressure to the sealed area to facilitate the vacuum system in removing the fluids and debris, and increases the vacuum pressure on the bottom surface of the vacuum housing resulting in improved performance of the drill template tool.

As shown in FIGS. 2-6, there is provided a drilling system for a structure 20, such as an aircraft structure, having an outside mold line surface 22 formed according to a computer aided design (CAD) engineering model, and having the outside mold line surface 22 specified using CAD electronic data files of the CAD engineering solid model. The system comprises a drill template tool 40 comprising a vacuum housing 41 having a CAD-formed contact surface 42 integral with and formed of the same material as the vacuum housing 41. The vacuum housing 41 and the contact surface 42 are built directly from the CAD engineering model for the outside mold line surface 22 of the structure 20 using one of selective laser sintering, fused deposition modeling, or stereolithography, so that the vacuum housing contact surface has the form of an exact fit to the outside mold line surface 22 of the structure 20 at the CAD-formed contact surface 42 whether or not in contact with the structure. The system further comprises at least one drill bushing 44 extending through the vacuum housing 41 from a top surface 55 of the vacuum housing 41 to a bottom surface 54 of the vacuum housing 41. The system further comprises at least one vacuum hose fitting 26 integral to the vacuum housing 41, wherein the vacuum housing 41 and the vacuum hose fitting 26 are integrally fabricated. The system further comprises an integral seal 50 formed in a groove portion 52 on the bottom surface 54 of the vacuum housing 41, wherein the integral seal 50 is in contact with the aircraft structure. The integral seal 50 is preferably formed around a periphery of the bottom surface 54 of the vacuum housing 41. The integral seal preferably comprises a material such as an elastomer or another suitable material. The integral seal contains or prevents leakage of fluids and debris generated by a drilling process of the aircraft structure. The integral seal increases a vacuum pressure on the bottom surface of the vacuum housing resulting in improved performance of the drill template tool. The integral seal 50 is preferably formed in the groove portion 52 on the bottom surface of the vacuum housing 41, and the groove portion 52 may be formed using laser sintering, fused deposition modeling, stereolithography, or another suitable process, during fabrication of the drill template tool. The integral seal is preferably compression fitted into the groove portion on the bottom surface of the vacuum housing.

As shown in FIGS. 3-6, there is also provided an integral seal 50 for a drill template tool 40 for a structure 20 having an outside mold line surface 22 fabricated according to a precise definition using computer aided design (CAD). The integral seal 50 comprises the inner surface 76 in contact with an interior portion of the continuous groove portion 52 formed in the bottom surface 54 of the vacuum housing 41 of the drill template tool 40. The integral seal 50 further comprises the outer surface 72 in contact with the structure 20. The integral seal 50 is formed in the groove portion 52 on the bottom surface 54 of the vacuum housing 41, and the groove portion 52 may be formed using selective laser sintering, fused deposition modeling, stereolithography, or another suitable process, during fabrication of the drill template tool 40. The integral seal 50 prevents leakage of fluids and debris generated by a drilling process of the structure 20. The integral seal comprises a material such as an elastomer or another suitable material. The integral seal increases a vacuum pressure on the bottom surface of the vacuum housing resulting in improved performance of the drill template tool. The integral seal is preferably compression fitted into the continuous groove formed in the bottom surface of the vacuum housing. The vacuum housing has a CAD-formed contact surface integral with and formed of the same material as the vacuum housing. The vacuum housing and the contact surface may be built directly from a CAD engineering model for the outside mold line surface of the structure using laser sintering, fused deposition modeling, stereolithography, or another suitable process, so that the vacuum housing contact surface has the form of an exact fit to the outside mold line surface of the structure at the CAD-formed contact surface whether or not in contact with the structure.

Figure 7:
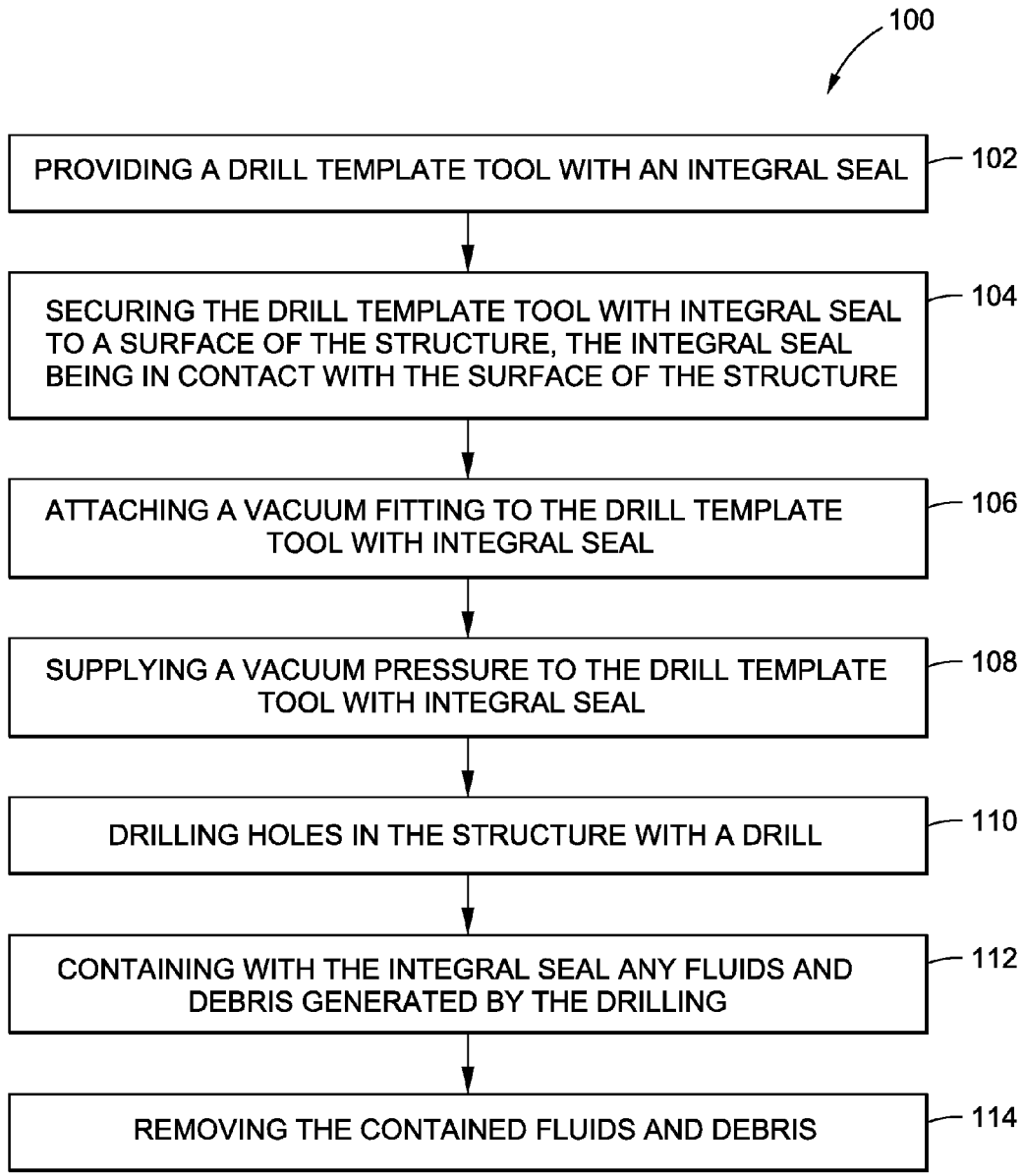

In another embodiment of the disclosure, there is provided a method 100 for drilling holes in a structure using one of the embodiments of the drill template tool with the integral seal of the disclosure. FIG. 7 is an illustration of a flow diagram of the steps of an embodiment of the method 100 for drilling holes in the structure 20 (see FIG. 2) using the drill template tool 40 with the integral seal 50 (see FIG. 3). The method 100 comprises step 102 of providing a drill template tool 40 with an integral seal 50. The drill template 40 with the integral seal 50 comprises a vacuum housing 41 having a CAD-formed contact surface 42 integral with and formed of the same material as the vacuum housing 41. The vacuum housing 41 and the contact surface 42 are built directly from a precise definition for an outside mold line surface 22 of the structure 20 using one of selective laser sintering, fused deposition modeling, or stereolithography, so that the vacuum housing contact surface has a form of an exact fit to the outside mold line surface 22 of the structure 20 at the CAD-formed contact surface 42 whether or not in contact with the structure 20. The drill template 40 with the integral seal 50 further comprises at least one drill bushing 44 extending through the vacuum housing 41 from a top surface 55 of the vacuum housing 41 to a bottom surface 54 of the vacuum housing 41. The drill template 40 with the integral seal 50 further comprises the integral seal 50 formed or provided in a groove portion 52 on the bottom surface 54 of the vacuum housing 41. The groove portion 52 may be formed using one of selective laser sintering, fused deposition modeling, or stereolithography. The method 100 further comprises step 104 of securing the drill template tool 40 with the integral seal 50 to a surface, such as the CAD-formed contact surface 42, of the structure 20. The integral seal 50 is preferably in direct contact with the surface 42 of the structure 20. The drill template tool 40 may be secured to the surface 42 of the structure 20 with one or more attachment elements such as pin clamps 36 (see FIG. 2). The method 100 further comprises step 106 of attaching a vacuum element or fitting, such as a vacuum hose fitting 26 (see FIG. 2) to the drill template tool 40 with the integral seal 50. In particular, the vacuum fitting or vacuum hose fitting 26 may be attached to the vacuum housing 41 of the drill template tool 40. A vacuum system (not shown) may be connected to the drill template tool 40 at vacuum port 24 via the vacuum hose fitting 26. The vacuum housing 40 may include the integral vacuum attach or vacuum port 24. The method 100 further comprises step 108 of supplying a vacuum pressure to the drill template tool 40 with the integral seal 50. In particular, the vacuum pressure may be supplied to the vacuum housing 41 of the drill template tool 40 via the vacuum fitting 26. The vacuum port 24 may be attached to a vacuum system known to one skilled in the art (not shown) via the vacuum hose fitting 26 so that the vacuum pressure may be applied through the vacuum hose fitting 26 to the interior of the vacuum housing 41 between the structure 20 and the drill template tool 40 with the integral seal 50. The method 100 further comprises step 110 of drilling holes in the structure 20 with a drill 33 (see FIG. 2). The drill 33 may be secured to the drill template tool 40 using the drill support attachment 32 (see FIG. 2). The drill support attachment 32 may be locked onto the drill 33 to help control the placement of the drill bit 30 into one or more drill bushings 44. The drill bushings 44 may be formed so that the drill bit 30 may be inserted into the drill bushing 44 and guided by the drill bushing 44 to form a hole in the structure 20. The vacuum housing 41 may include one or more drill support attachments 32. The method 100 further comprises step 112 of containing with the integral seal 50 any fluids and debris generated by the drilling step or process. The method 100 further comprises step 114 of removing the contained fluids and debris. The fluids and debris contained by the integral seal may be removed via the vacuum fitting 26 and the vacuum system. The vacuum hose fitting 26 is preferably connected to the vacuum system (not shown). The integral seal 50 on the drill template tool 40 contains the fluids and debris generated during the drilling process and facilitates the vacuum system via the vacuum port 24 attached to the vacuum housing 41 and the vacuum hose fitting 26 attached to the vacuum port 24 in sucking up and removing the contained fluids and debris. The integral seal 50 also increases the vacuum pressure on the bottom surface of the vacuum housing 41 resulting in improved performance of the drill template tool 40.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A drill template tool with an integral seal for a structure having an outside mold line surface, the drill template tool with the integral seal comprising:
 a vacuum housing having a contact surface integral with and formed of the same material as the vacuum housing, wherein the contact surface has a form of an exact fit to the outside mold line surface of the structure at the contact surface, whether or not in contact with the structure, the vacuum housing having a first side skirt with a plurality of holes along a length of a side of the vacuum housing, the first side skirt configured for connection to another vacuum housing;
 at least one drill bushing extending through the vacuum housing from a top surface of the vacuum housing to a bottom surface of the vacuum housing;
 a plurality of attachment elements inserted through the vacuum housing attaching the drill template tool to the structure; and,
 an integral seal inserted in a continuous groove portion located within the bottom surface of the vacuum housing, wherein the integral seal has an outer surface in contact with the structure and has an inner surface in contact with both a portion of the bottom surface of the vacuum housing and an interior of the groove portion.

2. The drill template tool of claim 1 wherein the integral seal is formed around a periphery of the bottom surface of the vacuum housing.

3. The drill template tool of claim 1 wherein the integral seal comprises an elastomer.

4. The drill template tool of claim 1 wherein the integral seal prevents leakage of fluids and debris generated by a drilling process of the structure.

5. The drill template tool of claim 1 wherein the integral seal increases a vacuum pressure on the bottom surface of the vacuum housing resulting in improved performance of the drill template tool.

6. The drill template tool of claim 1 wherein the integral seal surrounds a plurality of holes to accommodate drill bushings.

7. The drill template tool of claim 1 wherein the integral seal is compression fitted into the groove portion located within the bottom surface of the vacuum housing.

8. A drilling system for an aircraft structure having an outside mold line surface specified using CAD electronic data files of the CAD engineering solid model, the system comprising:
 a drill template tool with an integral seal comprising:
 a vacuum housing having a contact surface integral with and formed of the same material as the vacuum housing, wherein the contact surface has a form of an exact fit to the outside mold line surface of the structure at the contact surface whether or not in contact with the structure, the vacuum housing having a first side skirt with a plurality of holes along a length of a side of the vacuum housing, the first side skirt configured for connection to another vacuum housing;
 at least one drill bushing extending through the vacuum housing from a top surface of the vacuum housing to a bottom surface of the vacuum housing;
 at least one vacuum hose fitting integral to the vacuum housing, wherein the vacuum housing and the vacuum hose fitting are integrally fabricated;
 a plurality of attachment elements inserted through the vacuum housing attaching the drill template tool to the structure; and,
 an integral seal inserted in a continuous groove portion located within the bottom surface of the vacuum housing, wherein the integral seal has an outer surface in contact with the aircraft structure and has an inner surface in contact with both a portion of the bottom surface of the vacuum housing and an interior of the groove portion.

9. The drill template tool of claim 8 wherein the integral seal is formed around a periphery of the bottom surface of the vacuum housing.

10. The drill template tool of claim 8 wherein the integral seal comprises an elastomer.

11. The drill template tool of claim 8 wherein the integral seal prevents leakage of fluids and debris generated by a drilling process of the aircraft structure.

12. The drill template tool of claim 8 wherein the integral seal increases a vacuum pressure on the bottom surface of the vacuum housing resulting in improved performance of the drill template tool.

13. The drill template tool of claim 8 wherein the integral seal surrounds a plurality of holes to accommodate drill bushings.

14. The drill template tool of claim 8 wherein the integral seal is compression fitted into the groove portion located within the bottom surface of the vacuum housing.

15. A drill template tool with a gasket for a structure having an outside mold line surface, the drill template tool with the gasket comprising:
 a vacuum housing having a contact surface integral with and formed of the same material as the vacuum housing, wherein the contact surface has a form of an exact fit to the outside mold line surface of the structure at the contact surface whether or not in contact with the structure, the vacuum housing having a first side skirt with a plurality of holes along a length of a side of the vacuum housing, the first side skirt configured for connection to another vacuum housing;
 at least one drill bushing extending through the vacuum housing from a top surface of the vacuum housing to a bottom surface of the vacuum housing;

the gasket having an inner surface in contact with both a portion of the bottom surface of the vacuum housing and an interior portion of a continuous groove located within a bottom surface of the vacuum housing of the drill template tool and having an outer surface in contact with the structure, the gasket surrounding a plurality of holes formed in the bottom surface to accommodate drill bushings; and, a plurality of attachment elements inserted through the vacuum housing attaching the drill template tool to the structure;

wherein the gasket is compression fitted into the continuous groove prevents leakage of fluids and debris generated by a drilling process of the structure.

16. The drill template tool of claim 15 wherein the gasket comprises an elastomer.

17. The drill template tool of claim 15 wherein the gasket increases a vacuum pressure on the bottom surface of the vacuum housing resulting in improved performance of the drill template tool.

18. The drill template tool of claim 15 wherein the gasket facilitates containment of fluids and debris generated by drilling and manufacturing processes.

19. The drill template tool of claim 15 wherein the gasket is formed around a periphery of the bottom surface of the vacuum housing.

20. A method for drilling holes in a structure using a drill template tool with an integral seal, the method comprising:

providing a drill template tool with an integral seal comprising:

a vacuum housing having a contact surface integral with and formed of the same material as the vacuum housing, wherein the vacuum housing and the contact surface are built directly from a precise definition for an outside mold line surface of the structure using one of selective laser sintering, fused deposition modeling, or stereolithography, so that the vacuum housing contact surface has a form of an exact fit to the outside mold line surface of the structure at the contact surface whether or not in contact with the structure, the vacuum housing having a first side skirt with a plurality of holes along a length of a side of the vacuum housing, the first side skirt configured for connection to another vacuum housing;

at least one drill bushing extending through the vacuum housing from a top surface of the vacuum housing to a bottom surface of the vacuum housing; and, an integral seal inserted in a continuous groove portion located within the bottom surface of the vacuum housing and surrounding a plurality of holes formed in the bottom surface to accommodate drill bushings;

securing the drill template tool with the integral seal to a surface of the structure with a plurality of attachment elements, the integral seal having an outer surface in contact with the surface of the structure and having an inner surface in contact with both a portion of the bottom surface of the vacuum housing and an interior of the groove portion;

attaching a vacuum fitting to the drill template tool with the integral seal;

supplying a vacuum pressure to the drill template tool with the integral seal;

drilling holes in the structure with a drill;

containing with the integral seal any fluids and debris generated by the drilling; and, removing the contained fluids and debris.

21. The method of claim 20 wherein the integral seal increases the vacuum pressure on the bottom surface of the vacuum housing resulting in improved performance of the drill template tool.

* * * * *